(12) United States Patent
Gilles-Gagnon et al.

(10) Patent No.: US 8,387,319 B1
(45) Date of Patent: Mar. 5, 2013

(54) SOLAR PANEL SECURING ASSEMBLY FOR SHEET METAL SLOPING ROOFS

(75) Inventors: Francois Gilles-Gagnon, Quebec (CA); Raymond Gilbert, St-Augustin-de-Desmaures (CA)

(73) Assignee: Opsun Systems Inc., Saint-Augustin-de-Desmaures (Quebec) (CA)

( * ) Notice: Subject to any disclaimer, the term of this patent is extended or adjusted under 35 U.S.C. 154(b) by 7 days.

(21) Appl. No.: 13/224,652

(22) Filed: Sep. 2, 2011

(51) Int. Cl.
*E04D 13/18* (2006.01)

(52) U.S. Cl. .................................. 52/173.3; 52/712

(58) Field of Classification Search ............... 52/173.3, 52/712, 656.1, 714, 26
See application file for complete search history.

(56) References Cited

U.S. PATENT DOCUMENTS

| | | | |
|---|---|---|---|
| 4,467,582 A | 8/1984 | Hague | |
| 5,343,668 A * | 9/1994 | Gonzalez | 52/712 |
| 5,437,137 A * | 8/1995 | Allen | 52/712 |
| 5,715,634 A | 2/1998 | Schultz | |
| 7,102,074 B2 | 9/2006 | Yen | |
| 7,434,362 B2 | 10/2008 | Liebendorfer | |
| 7,703,256 B2 | 4/2010 | Haddock | |
| 8,128,044 B2 | 3/2012 | Liebendorfer | |
| 2005/0028470 A1 | 2/2005 | Verkamp | |
| 2010/0089389 A1 | 4/2010 | Seery | |
| 2010/0089390 A1 | 4/2010 | Miros | |
| 2010/0219304 A1 | 9/2010 | Miros | |

FOREIGN PATENT DOCUMENTS

| | | |
|---|---|---|
| FR | 2 638 772 | 11/1990 |
| WO | WO 2006/022613 A3 | 2/2006 |
| WO | WO 2008/084102 A2 | 7/2008 |

* cited by examiner

*Primary Examiner* — Basil Katcheves
(74) *Attorney, Agent, or Firm* — Robic LLP (57) ABSTRACT

A U-shaped spacer element supporting and retaining a photovoltaic panel assembly spacedly over a rooftop corrugated sheet; one shorter side leg thereof having an oblong bore, the other side leg having an intermediate ridge section. A screw engages into the ridge web and axially clears the shorter leg, anchoring the main body to the supporting rooftop frame elements through the corrugated sheet. The ridge section conformingly abuts against a longitudinal rib of the corrugated sheet. An L-shape bracket inner leg abuts against the main body short leg, the bracket outer leg abutting sideways against a registering portion of the photovoltaic panel assembly. A second oblong bore is made into the outer leg and extends parallel to the plane of the main body base leg. Two bolts engage the oblong bores and adjustably interlock the L-shape bracket to the spacer element main body and to the photovoltaic assembly.

9 Claims, 9 Drawing Sheets

SOLAR PANEL SECURING ASSEMBLY FOR SHEET METAL SLOPING ROOFS

FIELD OF THE INVENTION

The present invention generally relates to securing spacer elements for rooftop mounting of assemblies, and more specifically for sloping rooftops covered with corrugated sheet metal.

BACKGROUND OF THE INVENTION

Given the rapid climb of conventional energy costs and given the growing concerns about the environment, the interest in alternative energy sources that are both renewable and clean is growing steadfastly. In this regard, solar power is considered to be one promising solution since it is not only clean and renewable, but also plentiful: every day the sun hits the earth with roughly 20 000 times the current daily energy consumption by humankind.

The two main technologies currently used to harness the power of the sun are Concentrating Power Systems (CPS) and Photovoltaic (PV) Panels. Concentrating Solar Power (CSP) systems use lenses or mirrors and sun tracking systems to focus a large area of sunlight into a small beam. The concentrated heat is then used as a heat source for a conventional power plant. While these systems may be very efficient, they are also cumbersome and are thus typically installed on open ground, thus monopolizing expensive land space. Photovoltaic panels are assemblies of photovoltaic cells (also called solar cells or photoelectric cells), which are electrical devices that convert the energy of light directly into electricity by the photovoltaic effect. They come in the form of thin rectangle boxes that can be assembled into grids of various sizes. Given their smaller size and weight, they can be installed on a broader range of locations relative to CSP systems.

PV panels are commonly found over roofs because their height usually provides themes with better exposure to sun rays than open ground. Another advantage resides in the fact that rooftops are often unexploited otherwise, so that using this empty or "wasted" space can thus free open ground for better use. Furthermore, since roofs are by their nature part of buildings, hooking the PV panels directly to the existing electric facilities is often easier than with an open ground PV installation requiring some excavation work, foundation building and more complex outdoors wiring.

A roof construction typically consists of footings of various shapes and an outer weatherproof skin or covering. A simple ridged roof may consist of declined rafters that rest on vertical wall plates on top of each wall. The top ends of the rafters meet at the horizontal ridge plate or ridge beam. Horizontal purlins are fixed to the rafters to support the roof covering. Heavier under purlins are used to support longer rafter spans. The beams or ceiling joists, are connected between the lower ends of opposite rafters to prevent them from spreading and forcing the walls apart. Collar beams or collar ties may be fixed higher up between opposite rafters for extra strength.

Corrugated sheet metal panels are commonly used as sloping roof weatherproof covering material. A single corrugated sheet metal panel is typically composed of a series of large web sections separated by a series of thin raised rib sections, each panel starting and ending with a rib section. When assembled to form roof covering, the ending rib of the new panel being installed overlaps with the ending rib of the panel already in place, thereby providing a gravity borne mechanical seal. The sheet metal panels are fixed to the roofs furring strips or studs using lag screws placed over the ribs at sheet junction points to minimize leakage risks, the water being drained over the lowered section.

On most roofs, the trusses are spaced every 24 inches. On metal roofs, the metal sheets are screwed to the structure on the ribs to prevent leak problems. The ribs of a sheet metal roof are in many cases spaced at 9 inches. A metal sheet is usually 36 inches wide. The probability that the ribs of the sheet metal roof will be directly over a truss (rafters) is low. To ensure a good long term seal, the lag bolts of the mounting system have to be secured on top of sheet metal ribs. The number of roof clamps to be installed depends on the type of building structure and the size of the furring strips (studs). Furring strip studs are weaker than trusses, so more fixtures must be added accordingly. There are lots of different metal sheets with different rib shapes and sizes. Proper sealing with a good structural integrity is important. The metal sheets are usually fastened to furring strips or studs. These wood members are not always the same size and each consecutive pair thereof is not spaced the same distance relative to one another.

Installing PV panels on sloping roof can be challenging because not only are roofs generally hard to access and dangerous to operate on by workers, but they are also exposed to weathering elements, including heavy winds, rain or snow, and large temperature gradients. Such installations must therefore take into account of not only the weight of the panels and their support structure, but of the combined loads imposed on the roof infrastructure such as the wind load, the rain and snow loads, other equipment load, and so forth.

Furthermore, PV structural elements of the panels tend to accumulate heat when exposed to sunlight. Unfortunately photovoltaic performance degrades as their temperature increases. Excess heat can also lead to sheathing material degradation that can reduce the roof effectiveness in protecting the building. For example, excess heat could lead to sheet metal paint degradation, exposing the metal to corrosion, thus compromising the roof's integrity. Excess thermal loads can be mitigated by providing spacer elements between the PV panels and the rooftop sheathing, so that natural ventilation occurs.

However, it was found by the present inventor that such prior art spacer elements provided overall weak ventilation capabilities around the PV panels overhanging rooftops.

Finally, installing any equipment on a roof can increase water leakage hazard inside the building because of water, snow or ice accumulations that can lead to water levels rising above their usual levels, therefore exposing sections of the roof normally not or less exposed to water. In the case of sloping sheet metal roof, this could be water rising above a sheet metal rib with improperly sealed fastening screws. Moreover PV installations will likely require additional holes to be pierced across the roof's sheathing material in order to reach the underlying infrastructure to insure the proper anchoring of the PV panels support assembly. This evidently increases the risks of water leaking into the building.

It is recommended to wear gloves during PV installations, to prevent electrical hazard accidents.

SUMMARY OF THE INVENTION

The invention relates to a spacer element for supporting and retaining a peripheral edge portion of a photovoltaic panel assembly spacedly over a rooftop corrugated sheet supported by underlying rooftop frame elements, said spacer element including: a unitary main body being generally U-shaped and defining a base leg and two opposite first and second legs, said first leg being shorter than said second leg and having an oblong bore, said second leg having an intermediate ridge section extending parallel to said oblong bore and toward the plane of said first leg and forming a web and two diverging walls, said web closely spaced from said first leg parallel thereto, a screw aperture made centrally into said web and axially clearing said shorter first leg, said first and second legs defining inner walls facing each other and opposite outer walls, said second leg intermediate ridge section outer wall for abutting in conformingly fit fashion against a longitudinal rib of the corrugated sheet, a fraction of said first leg outer wall for supporting a peripheral edge portion of the photovoltaic panel assembly; a screw member engaging said main body screw aperture for anchoring said main body to the supporting rooftop frame elements through the corrugated sheet; an L-shape bracket, defining inner and outer legs, said bracket inner leg abutting against said main body first leg outer wall, said bracket outer leg for abutting sideways against a registering portion of the peripheral edge portion of photovoltaic panel assembly; and a first nut and bolt member engaging said first oblong bore and adjustably interlocking said L-shape bracket to said spacer element main body wherein said L-shape bracket is movable relative to said main body along an axis parallel to said main body ridge section for adjustment of the photovoltaic panel assembly in a plane parallel to the rooftop corrugated sheet.

Preferably, there is further included a second oblong bore made into said bracket outer leg and extending parallel to the plane of said main body base leg, and a second nut and bolt member engaging said second oblong bore for releasably adjustably interlocking said L-shape bracket to a registering portion of the peripheral edge portion of photovoltaic panel assembly, wherein said second nut and bolt member is movable along an axis orthogonal to the plane of said main body shorter first leg, for providing adjustable displacement transversely between the photovoltaic panel assembly and the rooftop corrugated sheet.

A flexible waterproof membrane, fixedly applied to said second leg outer wall, said membrane having a bore registering with said screw aperture, said screw member further engaging said membrane bore.

DETAILED DESCRIPTION OF THE DRAWINGS

Figure 1:
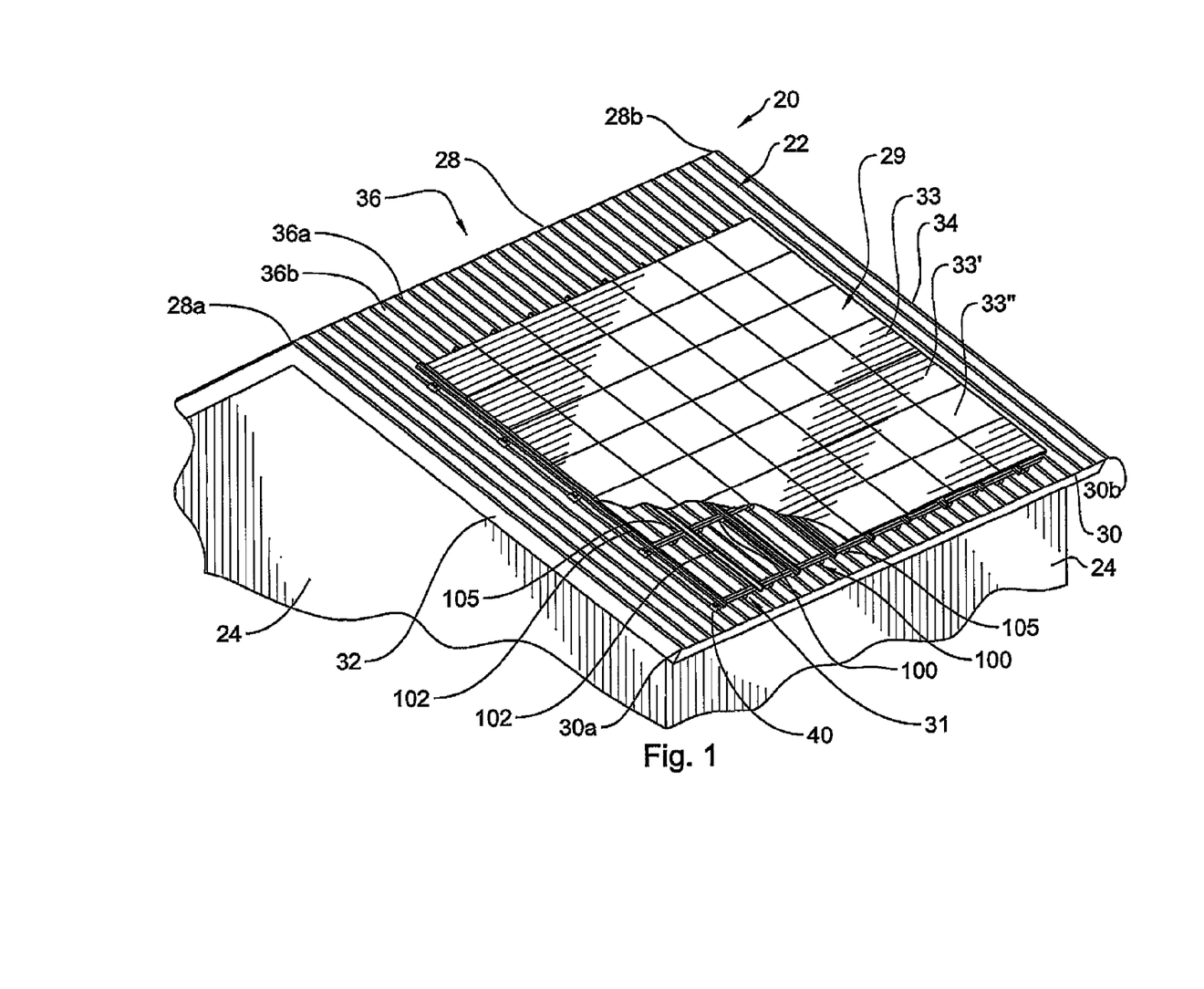
FIG. 1 is an isometric view of the rooftop portion of a house shown partly broken for the clarity of the view, and equipped with an array of PV panels secured thereto by spacer elements according to one embodiment of the invention.

FIG. 1 shows a building 20 comprising an upright side wall 24, and a sloping roof 22 partially supported by upright walls 24. Sloping roof 22 has a top edge 28 being the ridge of roof 22 and extending horizontally from a first end 28*a* to a second end 28*b*, a bottom edge 30 located at the bottom of roof 22 near the junction with upright wall 24 and extending from a first end 30*a* to a second end 30*b*, and inclined opposite lateral edges 32, 34 extending respectively from the top edge first and second ends 28*a*, 28*b* to the bottom edge first and second ends 30*a*, 30*b*.

Figure 2:
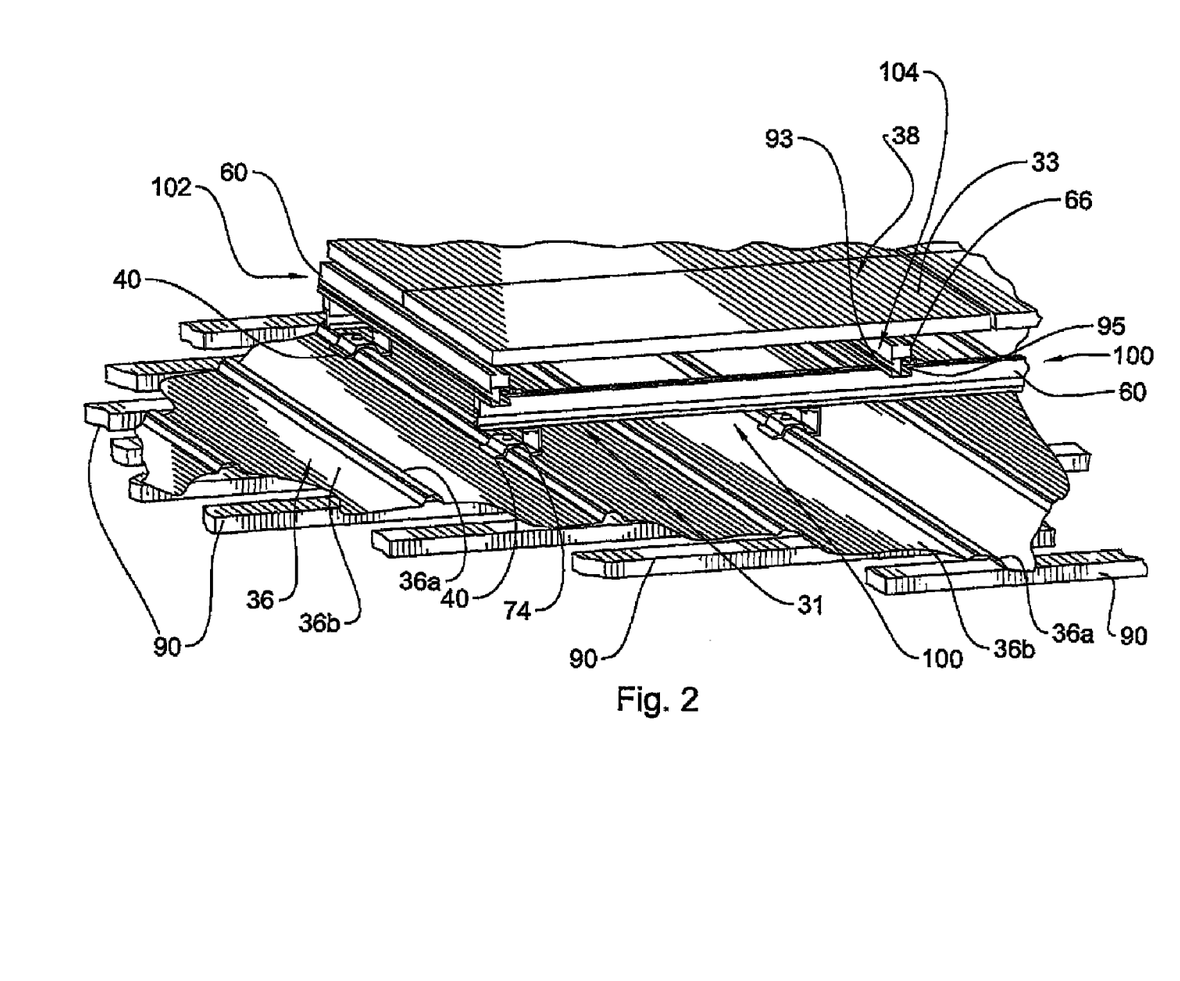
FIG. 2 is an enlarged view of a corner portion of the roof, PV panels and spacer elements of FIG. 1.
Figure 4:
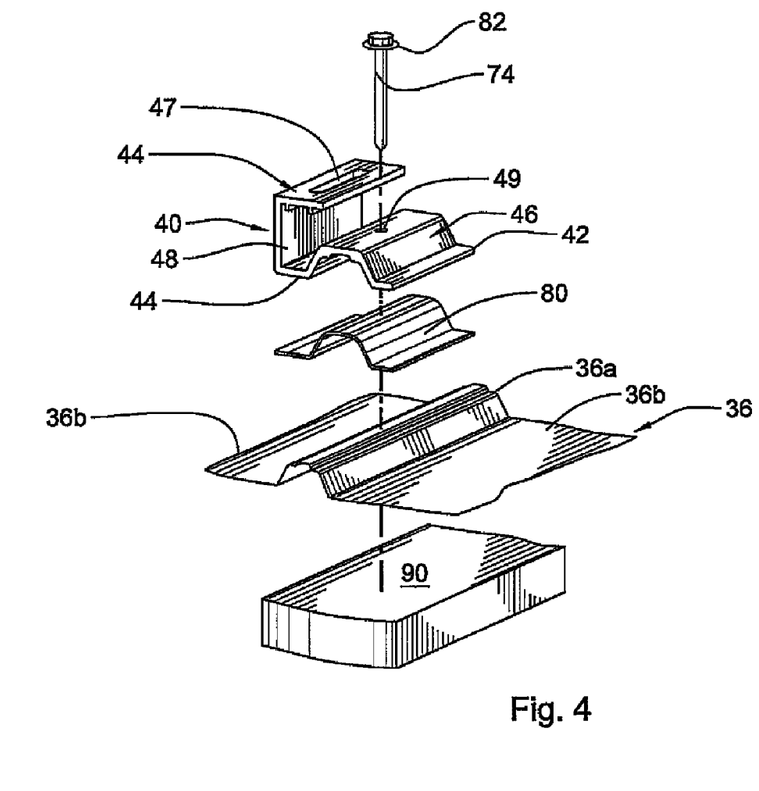
FIG. 4 is an exploded view of a spacer element, sealing membrane, corrugated sheet portion, and furring strips from FIG. 3.
Figure 5:
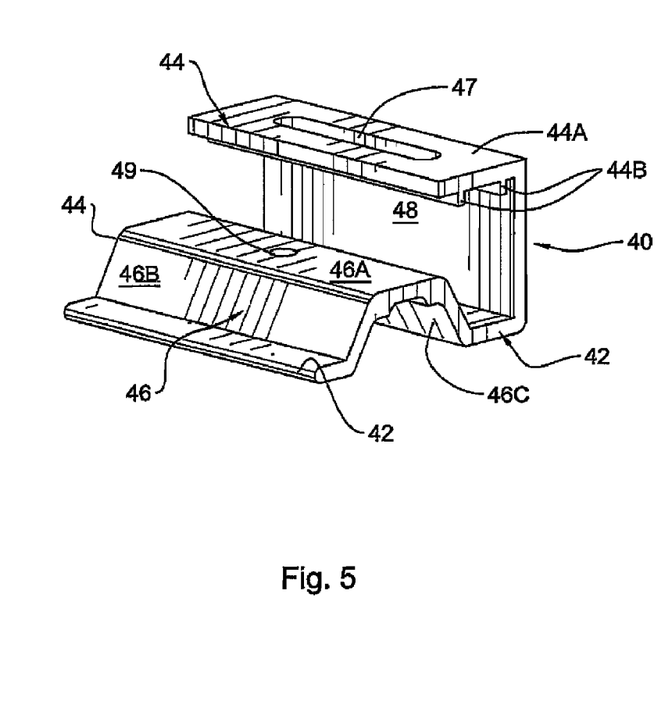
FIG. 5 is a view of en enlarged scale of the spacer element of FIG. 4.

Sloping roof 22 is covered with a corrugated sheet metal sheathing 36 (FIG. 2, 4) comprising a series of raised rib sections 36*a* separated by lowered base sections 36*b* each downwardly extending from the roof top edge ridge 28 to the roof bottom edge 30. Sloping roof 22 comprises a set of horizontal purlins or furring strips 90 (see FIG. 2) extending from lateral edge 32 to lateral edge 34 and placed at regular intervals between the roofs top and bottom edges 28, 30 to provide a support base for the installation of sheet metal sheathing 36.

Sloping roof 22 is equipped with a photovoltaic (PV) panel array 29 comprising one or more PV panels 33, 33', 33", arranged in a full or partial grid formation. PV panels 33, 33', 33", . . . are supported at the periphery of PV panel array by underlying extrusion support rails 100, 102, and at intermediate sections by additional transverse rails 104 spacely parallel to rails 102. PV panel array 29 is fixed on roof 22 with a PV panel mounting spacer system 31 further depicted in FIGS. 2 and 3.

Figure 3:
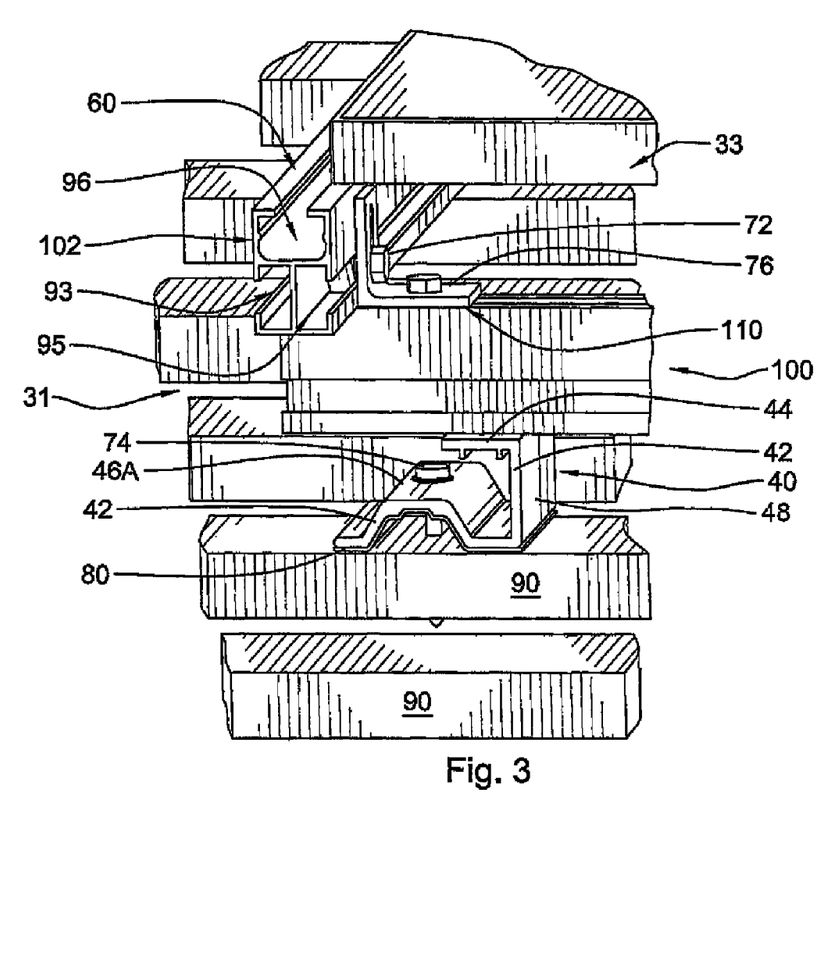
FIG. 3 is a view of still enlarged scale of the rooftop portion, PV panels and spacer elements of FIG. 2.
Figure 6:
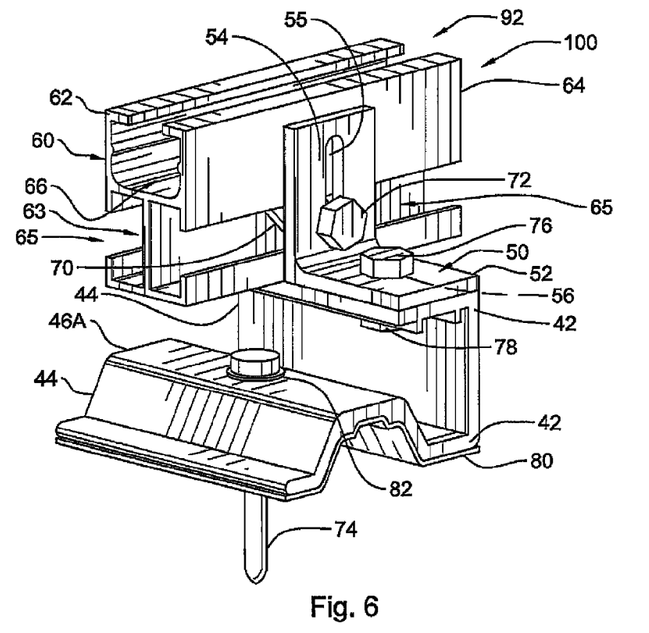
FIG. 6 is a view similar to FIG. 5 but further showing an attachment bolt and the integral adjustable height connector securing the PV panel peripheral frame (only a portion thereof being illustrated) to the spacer element.

According to a preferred embodiment of the invention illustrated in FIGS. 4 to 7 of the drawings, PV panel mounting spacer system 31 includes a number of spacer mounting elements 40, preferably forming generally U-shaped sheet metal fixtures. Each spacer element 40 defines a web 42, from which transversely projects a spacer leg 48, at one edge thereof. Web 42 further includes an intermediate ridge section 46 also transversely projecting therefrom toward leg 44 spacedly from leg 48. Ridge section 46 is sized and shaped to conformingly fit over corresponding rib section 36*a* of corrugated sheet 36. Ridge section 46 includes a raised flat section 46A, orthogonal to the plane of leg 48 and two diverging sections 46B, 46C. Ridge raised section 46A has a central lag bolt bore 49, for passage by a bolt 74 (FIG. 6). A seat leg 44 transversally projects from the longitudinal edge of leg 48 opposite web 42 and in overhanging fashion relative to web 42, but extending slightly short of the longitudinal axis of bore 49 for clearing same. Seat leg 44 includes an oblong bore 47 extending parallel to the longitudinal axis of raised ridge section 46A. Seat leg 44 is sized and shaped to provide seating support at an exposed outer face thereof 44A (opposite web 42) for a portion of PV panel assembly peripheral rail 100 or 102 (FIG. 3). As shown in FIG. 3, seat leg 44 preferably includes structural extruded projections 44B, projecting toward the plane of units 42, for increasing structural rigidity of spacer fixture 40. A bolt 76 (FIG. 6) releasably engages oblong bore 47.

In one embodiment, each pair of successive spacer fixtures 40, 40, on roof covering 36 support a width of up to six feet of PV panel assembly rail extrusions 60 (FIG. 6). The distance between spacer fixtures 40, 40, depends on the combined load and structural calculations by an Engineer.

Figure 7:
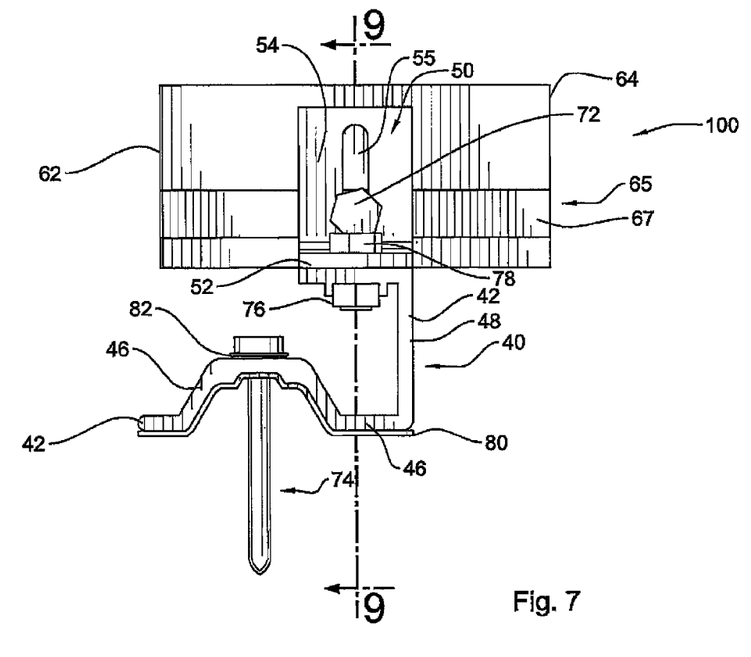
FIG. 7 is an edge view of the elements of FIG. 6.

As illustrated in FIGS. 6 and 7, PV panel mounting spacer system 31 also comprises L-shaped fixture corner brackets 50 defining first and second legs 52, 54. Leg 54 includes a second oblong slot 55 releasably engaged by a bolt 72.

As shown in FIG. 3, a set of L-shaped rail corner brackets 110 are provided to interlock corner portions of PV panel assembly rails 100 and 102 with bolt means 72, 76.

Figure 8:
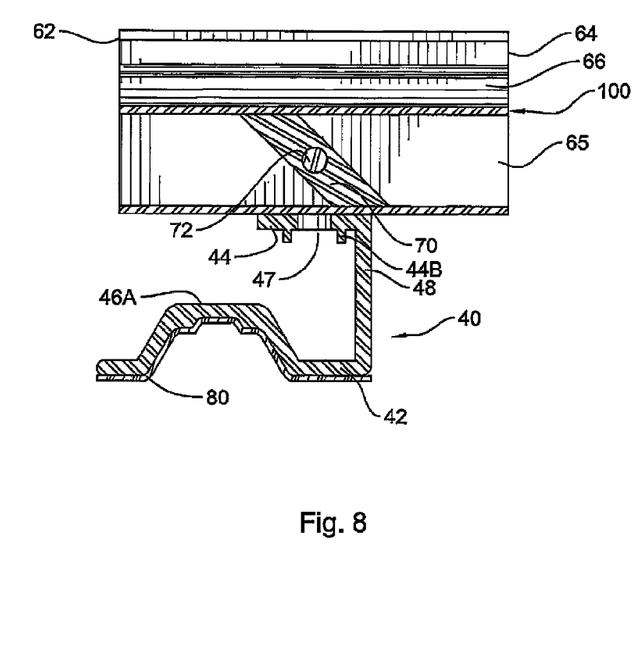
FIG. 8 is a cross sectional view of the elements of FIG. 7, without the attachment bolt.
Figure 9:
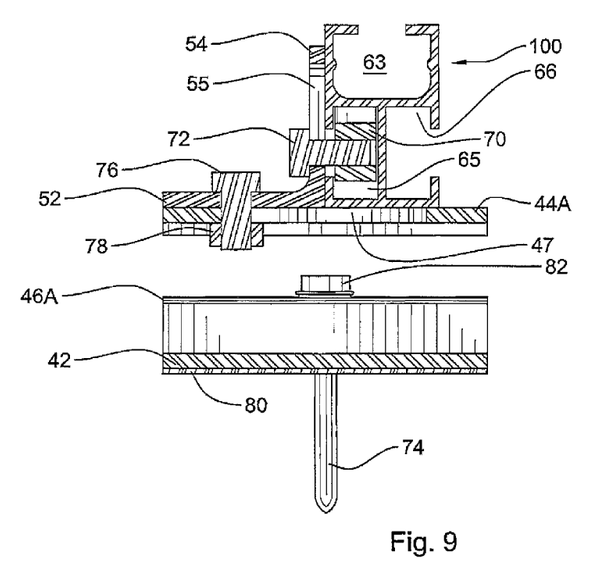
FIG. 9 is a cross sectional view taken along line 9-9 of FIG. 7.

Elongated support extrusion rails 60 (see FIGS. 2-3, 6) each defines first and second opposite ends 62, 64. Support rail 60 forms extrusion channels 63, 66, 67, opening at their opposite ends 62, 64. As shown in FIGS. 6 and 8, a zink-lock nut 70 of parallelepipedic shape is lodged inside extrusion channel 65 of rail 100, and is transversely threadingly engaged by bolt 72, the latter extending through oblong bore 55, so as to releasably interlock L-shape bracket 50 to rail 100. Rail 100 can be adjustably moved away from or toward exposed surface 44A of bracket seat leg 44 by temporarily unscrewing bolt 72 and allowing the bolt 72 to slide along oblong bore 55, wherein the spacer gap between planar PV panel assembly 29 and roof sheet covering 36 can vary.

A flexible waterproof adhesive membrane 80 is applied underneath the web 42 opposite leg 44 to be taken in sandwich between roof covering 36 and web 42. Sealing washer 82 (FIG. 4) is added to bolt 74, for improved waterproofness.

The first step in assembling PV mounting panel system 31 consists in placing an appropriate number of suitably interspaced spacer mounting elements 40 on the sheet metal sheathing 36 of roof 22 to form an adequate underlying support grid for PV panel array 29. The number of required spacer mounting elements 40 is typically determined by a structural engineer and depends on the combined downward pressure and the uplift pressure that the installation may likely have to sustain during its lifecycle, the strength of the purlins or furring strips 90 to which they are anchored (by bolts 74), and the size and thread depth of the lag bolts 72. The flexible adhesive sealing membrane 80 is first glued on the underface of web 46 thereby conformingly fitting therewith to provide sealing between the web 46 and the roof corrugated sheet 36. Spacer mounting element 40 is then placed over roof sheet metal rib 36a on an appropriate location as calculated by the structural engineer with the rib-shaped groove web 46 properly aligned with sheet metal rib member 36a of roof covering sheet 36. Lag bolt seal washer 82 is then placed beneath the head of lag bolt 74 which is in turn inserted into lag bolt hole 49 of web 46 and screwed through sheet metal rib member 36a into purlins or furring strips 90. The complete waterproof sealing of the installation is insured by the combined effect of the sealing nature of sealing membrane 80 flexible material, the sealing nature of sealing washer 82 material, the thickness of sealing membrane 80 compensating for irregularities on roof corrugated sheet 36, the shape of ridge 46 of spacer mounting element 40 matching the shape of rib member 36a of roof corrugated sheet 36, and the pressure induced by lag bolt 74 on matching ridge 46, seal washer 82 and sealing membrane 80.

Fixture corner bracket 50 (see FIG. 6) is then applied onto top surface 44A of spacer element 40. Bolt 76 is then successively inserted through bolt hole 56 of fixture corner bracket 50 and bolt slot 47 of sheet metal fixture 40, with bolt slot 47 allowing for the proper horizontal alignment between all corner brackets 50 located on the same rail. Nut 78 is then screwed on bolt 76, thereby anchoring the fixture corner bracket 50 to sheet metal fixture 40.

Once all spacer mounting elements 40 are secured along with their respective fixture corner brackets 50 forming a grid on roof covering 36, a number of lower support rails 100 matching the number of rows of spacer mounting elements 40 is installed, one more support rail 60 being linked together if need be by linking plates, and placed in parallel to roof top and bottom edges 28, 30. For each fixture corner bracket 50, lock bolt 72 is first inserted through lock bolt slot 55 and then partially secured by screwing lock nut 70 on lock bolt 72, leaving some room so that lock nut 70 can be later on inserted into one of extrusion channels 63, 65 of support rail 100, for example lock nut channel 65. For each support rail 100, each zinked lock nut 70 for that rail is successively inserted by aligning the lock nut 70 and fixed into place by fully screwing lock bolt 72, securing support rail 100 atop rail support leg 44 and against the rail securing member of corresponding fixture corner bracket 50. As the installation progresses, manual adjustments can be made as required to compensate for sheet metal fixtures 40 positioning errors by adjusting the position of fixture corner bracket 50 using bolt 72 in oblong slot 47 insuring that supports rails 100 are parallel and properly aligned with the roof top and bottom edges 28, 30. In a similar fashion, vertical alignment can be made as required by the installer using lock bolt oblong slots 59 on fixture corner brackets 50 insuring that support rails 102 are on an even plane parallel to the surface of roof 22 at adjustable distance.

Once all support rails 100 are in place, a number of upper support rails 102 are installed, each support rail 102 comprising one or more support rail elements 60 linked together if need be by linking plates, and placed in parallel to roof lateral edges 32, 34 in such a way that both lateral edges of PV panels 33 can rest on top of a supporting rail 102. Given the length and weight of PV panels 33, additional rails can be installed at regular intervals between the support rails 102 placed on each side of PV panels 33 to provide reinforced support under the midsection of PV panels 33. To proceed with upper support rail installation, rail corner brackets 110 are first installed at the junction point of every support rail 100 and support rail 102 on the underlying support rail 100. For each rail corner bracket 110, lock bolt 72 is first inserted through a rail extrusion channel and partially secured by screwing lock nut 70 on lock bolt 72, leaving some room so that lock nut 70 can be later on inserted into lock nut channel 66 of the underlying support rail 100. For each support rail 102, each lock nut 70 for that rail is successively inserted into the extrusion channel underlying support rail 100, and fixed in place facing either one of roof lateral edges 32, 34 (but always the same edge) by fully screwing lock bolt 72, securing rail corner bracket 110 atop underlying support rail 100.

Support rails 102 can now be installed using the rail corner brackets 110 installed on the lower rail support rails 100. For each rail corner bracket 110, lock bolt 72 is inserted in the rail extrusion channel and lock nut 70 is then partially screwed on lock bolt 72 so that lock nut 70 can be inserted into one of support rail 60 lock nut channels 63, 65, for example lock nut channel 65. For each support rail 102, each lock nut 70 for that column is successively inserted into a rail extrusion channel 102 by aligning the lock nut 70 therewith, and fixed into place by fully screwing lock bolt 72, securing support rail 102 atop underlying support rail 100 and against the rail securing member of corresponding rail corner bracket 50. As the installation progresses, manual adjustments can be made by adjusting the position of rail corner bracket 50 ensuring that supports columns 102 are parallel and properly aligned with the roof lateral edges 32, 34. In a similar fashion, vertical alignment can be made as required using lock bolt on rail corner brackets 110 ensuring that support rails 102 are on an even plane parallel to the surface of roof covering 36.

At this point, PV mounting system 31 is ready to receive the PV panels 33 forming PV array 29. PV panels 33 are evenly placed along the support rails 102 in a grid formation (FIG. 1), with each panel having its lateral edges coinciding with a support rail 102. PV panels 33 are secured onto the support rails 102 using various kinds of panel securing clamps: end-column clamps 102 are placed on the top and bottom edges of the PV panel array 29 preventing accidental movement of the panels 33 along an axis parallel to the roof lateral edges 32, 34, end-row clamps are placed on lateral edges of PV panel array 29 preventing movement of PV panels 33 along an axis parallel to the roof top and bottom edges 28, 30 and finally intersection clamps are placed at every junction point of four PV panels 33 preventing the movement of PV panels 33 along an axis perpendicular to the surface of roof covering 36 and to prevent from moving on the support rails. All three types of PV panel securing clamps are fixed using the lock bolt and nut 72, 70 combinations in slightly different ways: end-row clamps are secured on the support rails 102 that are located on each side of PV panel array 29 using the lock nut channel 66, end-column clamps are secured on the support rails 102 located on the top bottom and bottom edges of PV panel array 29, and intersection clamps are secured over the PV array 29 located on the top portion of the support rails 102 lying underneath.

One of the advantages of this invention is that the PV panels 33 are spacedly elevated from the sheet metal sheathing 36 of roof 22 allowing the wind to flow around PV panels 33, thus evacuating the excess generated heat more rapidly. This is important because PV panel performance degrades as their temperature increases beyond their optimal range.

The elevated status of PV panel array 29 also facilitates proper drainage under rain or melting snow conditions and at least partially prevents water or snow accumulations on the surface of the roof, altogether minimizing the risks of water reaching otherwise unexposed and possibly improperly sealed areas of roof 20, thereby reducing the risks of water leaking inside the building.

Moreover, elevated panels reduce the risk of damaging the roof sheathing's 36 protective paint coating by either excess of improper drainage leading to the corrosion of the sheet metal which can also lead to water leaking problems and costly repairs.

Finally sheet metal ribs offer lateral support, so mounting spacer elements 40 won't accidentally move or turn around their lag bolts 74 when PV mounting system 31 is exposed to extreme external forces, thereby providing a well-sealed and sturdy installation.

It is understood that the installation of a solar mounting system on any kind of roof must be supervised by a professional Engineer. A professional Engineer must design an appropriate anchoring system that allows the mounting system to be securely attached to the roof. Wind, snow and dead loads have to be considered in the structural engineer's analysis. The installer must verify that all roof anchors are attached to a structural member of the receiving structure: this includes purlins, rafters, truss cords, Z-rails or any other such structural member. The installer must verify that the roof, its rafters, connections and other structural members can support the array under all code-level loading conditions. The installer should ensure that all installed fasteners have adequate pullout strengths and shear capacity. Ensuring the strength of any fastener used to attach the present invention fixture mounting spacer element to the roof and the waterproof integrity of the roof, including the selection of appropriate flashing and sealing materials. The installer must ensure the safe installation of all electric aspects of the PV array. Parameters such as snow loading, wind loading, dead loads, exposure and topographic factors should be confirmed with professional Engineer.

Appropriate thermal management measures are necessary to ensure optimal performance of the PV array 29. There is an inverse relationship between operating temperature and system performance. Lower pitched roofs 22 typically trap more heat and thus cause solar arrays 29 to operate at higher temperature. For better cooling, the air gap between the roof sheet covering 36 and the PV panels 29 should be increased. Cooling alleys help evacuate heat and thus reduce operating temperature. Cooling alleys are edgewise spacings between two successive coplanar solar panel assemblies 29, 29, mounted on the supporting pairs of extrusion rails 60, 60. Preferably, a horizontal cooling alley should be mounted at least every six rows of PV panel assemblies 29. Such cooling alleys provide access for maintenance, heat evacuation and thermal expansion capability.

Different parameters have to be evaluated in order to build the right array with an optimized racking solution, to ensure maximum modular performance and maintain structural integrity.

Although the present securing spacer element 40 and associated L-shape bracket 50 are best suited for use with PV panel assemblies over sloping roofs, other applications are not excluded from the scope of the present invention, e.g. a work platform or an advertisement medium spacedly mounted over a building sloping roof.

The invention claimed is:

1. Spacer element for supporting and retaining a peripheral edge portion of a photovoltaic panel assembly spacedly over a rooftop corrugated sheet supported by underlying rooftop frame elements, said spacer element including:
   a) a unitary main body being generally U-shaped and defining a base leg and two opposite first and second legs, said first leg being shorter than said second leg and having an oblong bore, said second leg having an intermediate ridge section extending parallel to said oblong bore and toward the plane of said first leg and forming a web and two diverging walls, said web closely spaced from said first leg parallel thereto, a screw aperture made centrally into said web and axially clearing said shorter first leg, said first and second legs defining inner walls facing each other and opposite outer walls, said second leg intermediate ridge section outer wall for abutting in conformingly fit fashion against a longitudinal rib of the corrugated sheet, a fraction of said first leg outer wall for supporting a peripheral edge portion of the photovoltaic panel assembly;
   b) a screw member engaging said main body screw aperture for anchoring said main body to the supporting rooftop frame elements through the corrugated sheet;
   c) an L-shape bracket, defining inner and outer legs, said bracket inner leg abutting against said main body first leg outer wall, said bracket outer leg for abutting sideways against a registering portion of the peripheral edge portion of photovoltaic panel assembly, and
   d) a first nut and bolt member engaging said first oblong bore and adjustably interlocking said L-shape bracket to said spacer element main body wherein said L-shape bracket is movable relative to said main body along an axis parallel to said main body ridge section for adjustment of the photovoltaic panel assembly in a plane parallel to the rooftop corrugated sheet.

2. A spacer element as in claim 1, further including a second oblong bore made into said bracket outer leg and extending parallel to the plane of said main body base leg, and a second nut and bolt member engaging said second oblong bore for releasably adjustably interlocking said L-shape bracket to a registering portion of the peripheral edge portion of photovoltaic panel assembly, wherein said second nut and bolt member is movable along an axis orthogonal to the plane of said main body shorter first leg, for providing adjustable displacement transversely between the photovoltaic panel assembly and the rooftop corrugated sheet.

3. A spacer element as in claim 2, further including a flexible waterproof membrane, fixedly applied to said second leg outer wall, said membrane having a bore registering with said screw aperture, said screw member further engaging said membrane bore.

4. In combination, a planar photovoltaic panel assembly having a peripheral frame, and a spacer element supporting and retaining said peripheral frame of photovoltaic panel assembly spacedly over a rooftop corrugated sheet supported by underlying rooftop frame elements, said spacer element including:
   a) a unitary main body being generally U-shaped and defining a base leg and two opposite first and second legs, said first leg being shorter than said second leg and having an oblong bore, said second leg having an intermediate ridge section extending parallel to said oblong bore and toward the plane of said first leg and forming a web and two diverging walls, said web closely spaced from said first leg parallel thereto, a screw aperture made centrally into said web and axially clearing said shorter first leg, said first and second legs defining inner walls facing each other and opposite outer walls, said second leg intermediate ridge section outer wall for abutting in conformingly fit fashion against a longitudinal rib of the corrugated sheet, a fraction of said first leg outer wall supporting said peripheral frame of photovoltaic panel assembly;
   b) a screw member engaging said main body screw aperture for anchoring said main body to the supporting rooftop frame elements through the corrugated sheet;
   c) an L-shape bracket, defining inner and outer legs, said bracket inner leg abutting against said main body first leg outer wall, said bracket outer leg abutting sideways against a registering portion of the peripheral frame of photovoltaic panel assembly, and
   d) a first nut and bolt member engaging said first oblong bore and adjustably interlocking said L-shape bracket to said spacer element main body wherein said L-shape bracket is movable relative to said main body along an axis parallel to said main body ridge section for adjustment of the photovoltaic panel assembly in a plane parallel to the rooftop corrugated sheet.

5. A spacer element and photovoltaic panel assembly combination as in claim 4, further including a second oblong bore made into said bracket outer leg and extending parallel to the plane of said main body base leg, and a second nut and bolt member engaging said second oblong bore and releasably adjustably interlocking said L-shape bracket to a registering portion of said peripheral frame of photovoltaic panel assembly wherein said second nut and bolt member is movable along an axis orthogonal to the plane of said main body shorter first leg, for providing adjustable displacement between the photovoltaic panel assembly and the rooftop corrugated sheet.

6. A spacer element and photovoltaic panel assembly combination as in claim 5, further including a flexible waterproof membrane, fixedly applied to said second leg outer wall, said membrane having a bore registering with said screw aperture, said screw member further engaging said membrane bore.

7. In combination, a planar photovoltaic panel assembly having a peripheral frame, rooftop purlins for supporting a building rooftop corrugated sheet, and a number of spacer elements supporting and corner portions of said peripheral frame of photovoltaic panel assembly spacedly over the rooftop corrugated sheet, each of said spacer elements including:
   a) a unitary main body being generally U-shaped and defining a base leg and two opposite first and second legs, said first leg being shorter than said second leg and having an oblong bore, said second leg having an intermediate ridge section extending parallel to said oblong bore and toward the plane of said first leg and forming a web and two diverging walls, said web closely spaced from said first leg parallel thereto, a screw aperture made centrally into said web and axially clearing said shorter first leg, said first and second legs defining inner walls facing each other and opposite outer walls, said second leg intermediate ridge section outer wall for abutting in conformingly fit fashion against a longitudinal rib of the corrugated sheet, a fraction of said first leg outer wall supporting said peripheral frame of photovoltaic panel assembly;
   b) a screw member engaging said main body screw aperture and anchoring said main body to a corresponding said rooftop purlin and for engagement through the corrugated sheet;
   c) an L-shape bracket, defining inner and outer legs, said bracket inner leg abutting against said main body first leg outer wall, said bracket outer leg abutting sideways against a registering portion of the peripheral frame of photovoltaic panel assembly; and
   d) a first nut and bolt member engaging said first oblong bore and adjustably interlocking said L-shape bracket to said spacer element main body wherein said L-shape bracket is movable relative to said main body along an axis parallel to said main body ridge section for adjustment of the photovoltaic panel assembly in a plane parallel to the rooftop corrugated sheet.

8. A combination as in claim 7, further including a second oblong bore made into said bracket outer leg and extending parallel to the plane of said main body base leg, and a second nut and bolt member engaging said second oblong bore and releasably adjustably interlocking said L-shape bracket to a registering portion of said peripheral frame of photovoltaic panel assembly wherein said second nut and bolt member is movable along an axis orthogonal to the plane of said main body shorter first leg, for providing adjustable displacement between the photovoltaic panel assembly and the rooftop corrugated sheet.

9. A spacer element and photovoltaic panel assembly combination as in claim 8, further including a flexible waterproof membrane, fixedly applied to said second leg outer wall, said membrane having a bore registering with said screw aperture, said screw member further engaging said membrane bore.

* * * * *